Dec. 16, 1930.  H. S. BUSEY  1,785,248
CHUCKS FOR SPOOLING OR REELING MACHINES
Filed June 28, 1929   2 Sheets-Sheet 1
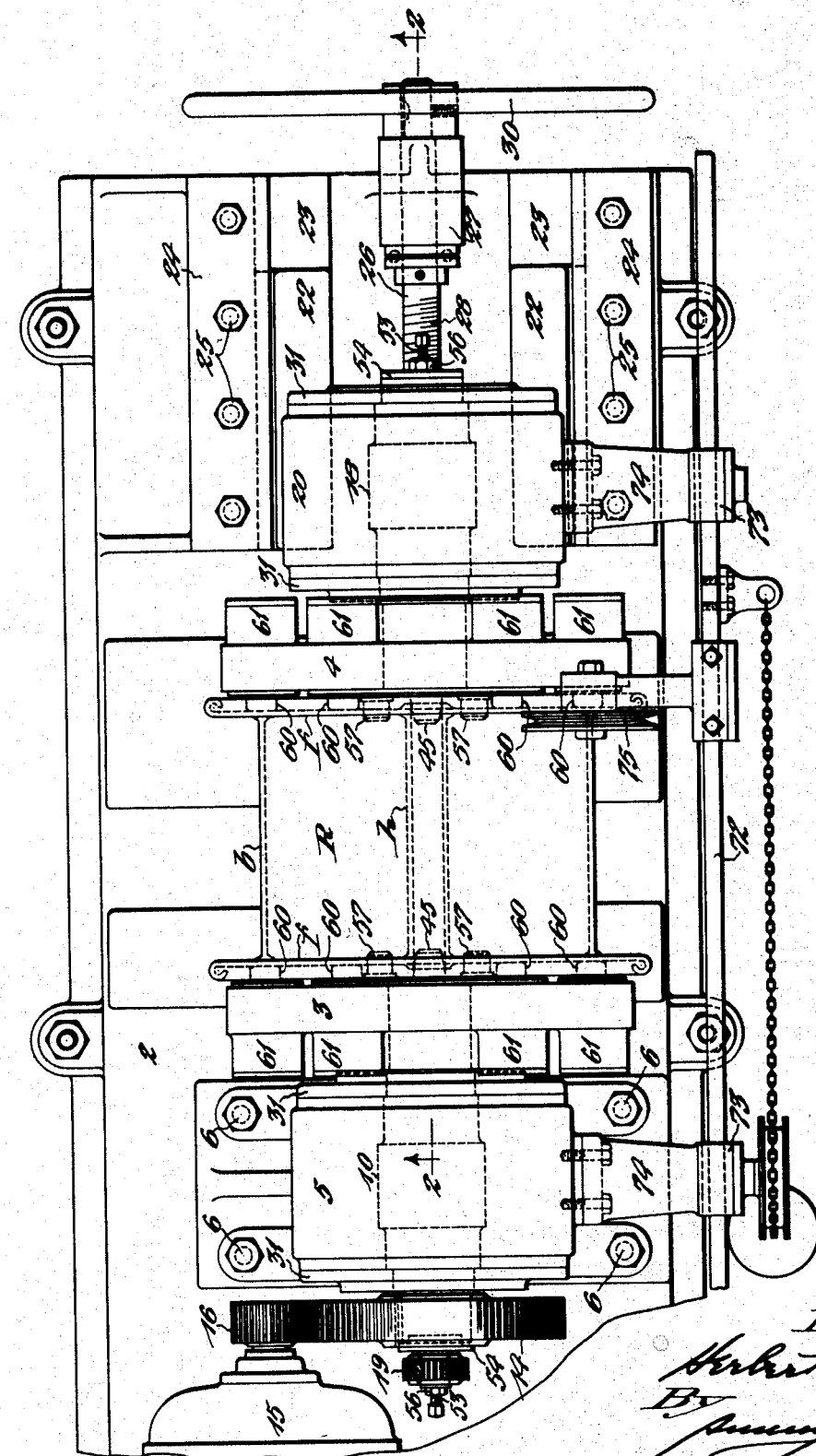

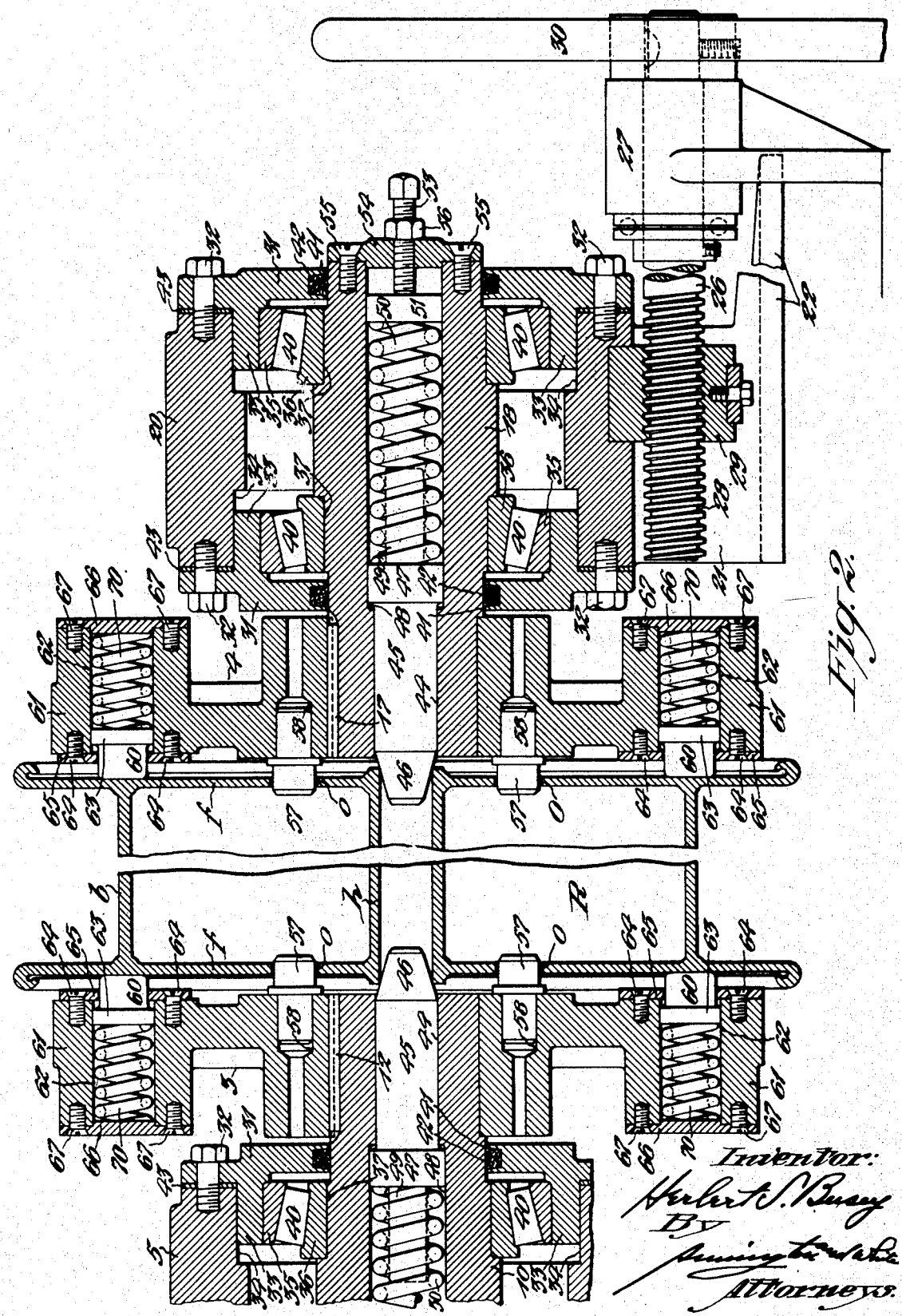

Patented Dec. 16, 1930

1,785,248

UNITED STATES PATENT OFFICE

HERBERT S. BUSEY, OF PROVIDENCE, RHODE ISLAND, ASSIGNOR TO AMERICAN ELECTRICAL WORKS, OF PHILLIPSDALE, RHODE ISLAND, A CORPORATION OF RHODE ISLAND

CHUCK FOR SPOOLING OR REELING MACHINES

Application filed June 28, 1929. Serial No. 374,496.

This invention relates to spooling machines for spooling or reeling wire and like materials, and particularly to an improved chuck for rotatively supporting the spool or reel on which the material is coiled.

One object of the invention is to provide a chuck having a fixed head with driving connections for rotating the spool or reel and an adjustable head arranged opposite thereto to adapt the chuck to hold spools of different sizes.

Another object of the invention is to provide a chuck having self-adjusting centers for holding the spool concentrically of the axis on which it rotates and further self-adjusting means for steadying and supporting the spool at its sides to prevent it from vibrating or running out of true.

Another object of the invention is to provide a chuck or spool-holder having friction-reducing bearings for rotatably supporting the spool to prevent wear and deterioration on the operating parts of the machine.

Further objects of the improvement are set forth in the following specification which describe a preferred form of construction of the invention by way of example as illustrated by the accompanying drawings. In the drawings:

Fig. 1 is a plan view of a spooling or reeling machine showing the improved chuck as applied to use thereon for rotatively supporting the spool or reel on which the wire or other material is wound; and Fig. 2 is an enlarged horizontal sectional view of the spool-holding chuck taken on line 2—2 of Fig. 1.

As shown in Fig. 1 of the drawings the spooling or reeling machine is constructed with a bed-plate 2 on which are mounted the fixed and movable bearings for the opposite heads 3 and 4 which constitute the chuck for rotatively supporting the reel or spool R. The fixed bearing 5 consists of a bracket bolted to the bed 2 at 6 and carrying roller-bearings, to be later described, for the hollow shaft 10 of the circular driving-head 3. The driving-head 3 is mounted on the forward end of the shaft 10 and keyed rotatively therewith at 12. The shaft 10 carries a gear 14 on its rearward end whereby it may be connected to be driven from a motor or other suitable source of power. As shown in fragmentary view in Fig. 1, a motor 15 is mounted on the bed 2 and its shaft carries a pinion 16 which meshes directly with the gear 14 to drive the shaft 10.

The adjustable head 4 is of substantially the same construction as the fixed head 3, being keyed at 17 to a hollow shaft 18 which is journaled in a movable bearing 20. As shown in the drawings the movable bearing 20 is provided with legs 21 formed with runners 22 which slide on horizontal ways 23 on the bed 2. The runners 22 are held in place and guided on the ways 23 by means of cleats 24 bolted to the bed 2 at 25 and overhanging the shouldered sides of the runners.

Manually-operable means are provided for sliding the adjustable bearing 20 longitudinally of the bed 2 to move the head 4 toward and away from the fixed head 3, whereby to provide for placing the spool in the chuck and removing it therefrom. As herein shown a horizontal shaft 26, journaled in a bearing 27 at the end of the bed 2, is provided with screw-threads 28 engaging an interiorly threaded hole in a block 29 let into the underside of the bearing 20. A hand-wheel 30 keyed to the end of the shaft 26 serves as the means for turning the screw to slide the bearing 20 on its ways on the bed 2.

The shafts 10 and 18 carrying the heads 3 and 4 are of the same construction and, likewise, their journals in the bearings 5 and 20 are of identical form and arrangement. It will therefore be sufficient to describe the mounting for the shaft 18. As shown at the right in Fig. 2 the bearing 20 is constructed in the form of an annular hub or boss having an enlarged axial bore, the ends of which are counterbored at 34 to receive the flanged bearing caps 31. The bearing caps 31 are bolted to the ends of the bearing 20 at 32 and their flanges 33 fit snugly within the counterbores 34. Fitted to the interior of the flanges 33 are annular bearing races 35 having inclined faces arranged opposite a pair of cooperating inner bearing races 36 held fast on the shaft 18. The bearing races 36 are fitted to shouldered faces 37 on the exterior of the shaft 18 and their outer peripheries are recessed to receive the tapered rollers 40 which revolve between the inner and outer races. The axial bores 41 of the bearing caps 31 fit closely around the projecting ends of the shaft 18 and are provided with inset packing rings or gaskets 42 to prevent the leakage of oil from the bearings. The caps 31 also have packing rings or gaskets 43 inserted between their rims and the ends of the bearing 20 to provide an oil-tight joint at these points.

Fitted to slide in the axial bore 44 of the shaft 18 is a plunger pin 45 which cooperates with a similar sliding center or pin 45 in the shaft 10 to enter the bore of the spool R to support the latter concentrically of the axis of the chuck. For this purpose the ends of the pins or centers 45 are tapered at 46 whereby they automatically adjust themselves to bores of varying sizes when different types of spools are employed. At their opposite ends the studs 45 are formed with heads 47 which slide in enlarged counterbores 48 extending throughout the greater part of the length of the shafts 10 and 18. Projecting from the heads 47 of the studs 45 are reduced stems 49 which are received within the coils of helical springs 50. The rearward end of each spring 50 abuts a disk or washer 51 which is adjustable longitudinally of the counterbores 48 in the shafts by means of set-screws 53. As shown at the right in Fig. 2 the set-screw 53 is threaded through a disk-like cap 54 secured to the end of the shaft 18 by means of screws 55. By turning the set-screw 53 the washer 51 may be slid longitudinally of the counterbore 48 to adjust the tension of the spring 50 which acts to hold the stud or center 45 projected from the opposite end of the shaft 18. A check-nut 56 on the set-screw 53 is screwed up against the face of the cap 54 to lock the screw in its adjusted position. It will be noted by reference to Fig. 1 that the opposite shaft 10 also carries a set-screw 53 at its end which is employed to adjust the spring 50 for the sliding stud or center 45 in the driving-head 3.

Both of the heads 3 and 4 are of substantially the same form and construction and each carries a pair of driving-pins or dogs 57 for rotatively connecting the spool R with the heads. As shown in Fig. 2 the driving-pins or dogs 57 are driven into bores 58 in the hubs of the heads 3 and 4 with their enlarged ends projecting therefrom to adapt them to enter suitable openings $o$ in the sides of the spool or reel R.

As herein illustrated the spool or reel R is of usual type constructed from sheet-metal with a relatively large drum or barrel $b$ and circular side-flanges or heads $f$ supported from a hub $h$ having a relatively small axial bore extending therethrough. Spools or reels of this character are apt to become deformed and their flanges forced out of true during their use in carrying the relatively heavy loads of wire. It is therefore highly desirable that the chuck for holding the reel be adapted to support the latter in such a way as to prevent it from running out or from shaking and vibrating as it is rotated at high speed in the spooling machines. To accomplish this purpose the present invention provides for bracing and steadying the flanges of the spool as it is held in the chuck.

As illustrated in Fig. 2 each of the heads 3 and 4 carries a plurality of spring-pressed plungers 60 disposed at intervals around its circumference and adapted to bear against the sides of the flanges $f$ of the spool or reel R. Arranged adjacent the peripheries of the heads 3 and 4 are bosses or hubs 61 provided with bores 62 which receive the enlarged heads 63 of the plunger pins 60. Fastened to one end of each hub 61 by means of screws 64 is a cap 65 having a central hole through which the plunger 60 projects. At the opposite end of each hub is a cap 66 held in place by screws 67, and arranged between the head of the plunger 60 and the cap 66 is a helical spring 70 which acts to project the end of the plunger outwardly from the face of the head. The springs 70 in the opposite heads 3 and 4 thus act to maintain the plungers 60 pressed firmly against the sides of the flanges $f$ of the reel R to brace the spool at points outwardly away from its axis whereby to prevent it from running out of true and chattering or vibrating as it is rotated with the chuck under the impulse of the power-driven shaft 10.

Referring to Fig. 1, the spooling machine is provided with a reciprocable traverse-bar 72 which slides in suitable guides 73 carried by brackets 74 bolted to the sides of the bearings 5 and 20. The traverse-bar 72 carries a grooved guide-wheel or sheave 75 which is traversed longitudinally of the barrel $b$ of the reel R when the bar is reciprocated from a cam or other means, not herein shown. The traverse-mechanism of the spooler may be driven from a transmission chain, not shown, passing over a gear 19 on the end of the shaft 10 which carries the driving head 3, thus synchronizing the action of the traverse guide-wheel with the rotation of the spool or reel R. Through this arrangement the wire running over the sheave or wheel 75 is traversed on the barrel of the reel R to deposit it in coils laid between the flanges $f$ of the reel. In use the complete machine operates as next explained.

The spooling or reeling machine may be used in connection with wire-drawing machinery or it may be employed for winding the wire on spools or reels as it comes from any other process. To prepare the reeling machine for operation the chuck is adjusted to separate its two heads 3 and 4 whereby the spool or reel R may be applied to position therebetween. This is accomplished by turning the hand-wheel 30 to slide the bearing 20 on its ways 23 under the action of the screw 28. After the heads 3 and 4 have been separated to a sufficient extent to admit a reel of the required size, the reel is applied to the chuck by inserting it between the heads with its axis in line with the centers thereof. The slidable bearing 20 is then moved forward by turning the hand-wheel 30 to adjust the head 4 towards the head 3, whereby to enter the plunger studs or centers 45 within the ends of the bore in the hub $h$ of the reel.

As the head 4 moves toward the head 3 the tapered ends of the centers 45 will be forced into the ends of the hub $h$ to bring the reel into concentric relation with respect to the axis of the chuck. In the meantime the driving dogs or pins 57 are entered into the holes or openings $o$ in the flanges of the reel R and the spring-pressed plungers 60 are caused to impinge against the sides of the reel to clamp it in position. The adjustable head 4 is carried toward the fixed head 3 until the plungers 60 bear with considerable pressure against the sides of the reel, and coincidentally therewith the sliding studs or centers 45 will automatically adjust themselves longitudinally of the axis of the chuck to provide for this clamping action against the sides of the reel. In this way the reel is first centered or adjusted in concentric relation with respect to the axis on which it turns and pressure is then brought to bear against its sides to true its flanges while clamping the latter at points adjacent their outer peripheries.

It will thus be seen that the present improved construction provides for automatically centering the reel and further supplies means for clamping it securely in place in the chuck. When the machine is operated from the motor 15 the shaft 10 carrying the fixed head 3 is driven to rotate the reel R through the medium of the dogs 57 engaging in the openings $o$ in the flanges. The opposite adjustable head 4 is also rotatively connected with the reel by means of its dogs 57 and therefore is turned with the reel with its shaft 18 rotating in the journals in the bearing 20. The roller bearings for the two shafts 10 and 18 provide for high speed rotation of the chuck with a minimum of friction and wear on the moving parts and further tends to maintain the opposite shafts in accurate alinement.

As the reel R rotates with the chuck the traverse-bar 72 is reciprocated to traverse the guide-wheel 75 back and forth longitudinally of the barrel of the reel to cause it to deposit the wire in layers extending between the heads or flanges $f$. After the reel has been filled the bearing 20 is moved to the right by operating the hand-wheel 30 whereby to withdraw the head 4 away from the fixed head 3. The spool or reel R will then be released so that it may drop down onto the base 2 to be rolled out of the machine; or in other cases a tackle may be attached to the reel to lift it away from the chuck.

It will be observed that the present invention provides a simple yet efficient form of chuck for holding spools, reels or the like during the operation of winding wire or similar materials thereon. In the present construction the parts of the chuck are so designed as to give maximum strength and greater rigidity without undue weight and bulk. Furthermore, the chuck is fully automatic in its operation so that the spools are centered and held in alinement by the mere act of closing the chuck heads together.

While I have herein illustrated the invention as embodied in a preferred form of construction it is to be understood that various modifications may be made in the design and arrangement of the parts thereof without departing from the spirit or scope of the invention.

Therefore, without limiting myself in this respect, I claim:

1. In a spooling or reeling machine, a chuck comprising a rotatable driving-head, a movable head rotatable opposite the driving-head, means for adjusting the movable head toward and away from the driving-head, resiliently-acting means on the heads for engaging against the flanges of a spool or reel held therebetween, and self-adjusting centers slidable axially of the heads to adapt them to engage the bore of the reel or spool to support the latter concentrically of the axis of rotation of the heads.

2. In a spooling or reeling machine, a chuck comprising a rotatable driving-head, a movable head adapted for adjustment towards and away from the driving-head, self-adjusting centers slidable axially of the heads to adapt them to engage the bore of a reel or spool, and means slidable on the heads to engage the sides of the reel to clamp the latter in position in the chuck to prevent it from running out of true or vibrating.

3. In a spooling or reeling machine, a chuck comprising a rotatable driving-head, a movable head rotatable opposite the fixed head, means for adjusting the movable head toward and away from the driving-head, taper-ended studs slidable axially of the heads to adapt them to engage the bore of a spool or reel mounted between the heads, springs for sliding the studs, plungers slidably mounted in the heads in position to engage the sides of the spool held between the heads, and springs for sliding the plungers to clamp them against the sides of the spool to prevent the latter from running out of true or vibrating.

4. In a spooling or reeling machine, the combination of a fixed bearing, a shaft journaled in said bearing, a driving-head carried on said shaft, a movable bearing arranged opposite the fixed bearing, a second shaft journaled in the movable bearing, an adjustable head carried on said second shaft, means for operating the movable bearing to carry the adjustable head toward and away from the fixed head, centers projecting from the heads to engage the bore of a spool or reel supported therebetween, sliding plungers in the heads for engaging the sides of the spool or reel, and springs for forcing the plungers against the reel.

5. In a spooling or reeling machine, the combination of a fixed bearing, a hollow shaft journaled in said bearing, a head carried on the end of the shaft, a movable bearing arranged opposite the fixed bearing, a second hollow shaft journaled therein, a head carried on the second shaft, means for moving the second bearing toward and away from the first bearing to adjust the relative position of the heads, means on the heads for engaging the flanges of a spool or reel held therebetween, studs slidable axially of the hollow shafts and having tapered ends projecting beyond the opposed faces of the heads, and springs housed in the hollow shafts and acting against the studs to project their ends into engagement with the bore of the spool or reel held between the heads.

6. In a spooling or reeling machine, the combination of a fixed bearing, a movable bearing adjustable toward and away from the fixed bearing, races carried by said bearings, opposite shafts arranged in alinement in said bearings, races carried on said shafts, rollers between the races on the shafts and in the bearings, a fixed head carried on one shaft, an adjustable head carried on the opposite shaft, means on the heads for engaging the flanges of a spool or reel held therebetween, and centers slidable axially of the heads to adapt them to enter the bore of the spool or reel mounted between the heads.

7. In a spooling or reeling machine, the combination of a fixed bearing, a movable bearing arranged opposite the fixed bearing, roller journals at the ends of said bearings, shafts rotatable in said journals, heads supported on the ends of said shafts, means for sliding the movable bearing to adjust one head toward and away from the other head, centers slidable axially of the heads for engaging the bore of a spool or reel arranged therebetween, and slidable plungers on the heads for engaging the sides of the reel to steady the latter and prevent it from running out of true.

8. In a chuck for spooling and reeling machines, the combination of a rotatable head, a second head rotatable opposite the first head and adjustable in lateral relationship therewith, sliding plungers arranged axially of the heads and having tapered ends projecting therefrom, springs for projecting the plungers into engagement with the bore of a spool or reel inserted between the heads, means for adjusting the tension of the springs, and resiliently-operated means on the heads adapted to engage the sides of the spool to steady it in the chuck.

9. In a chuck for spooling and reeling machines, the combination of a pair of opposite hollow shafts, heads carried by the shafts, means for adjusting the heads toward and away from each other, means on the heads for engaging the flanges of a spool or reel arranged therebetween, plunger studs slidable in the bores of the shafts and formed with tapered ends projecting beyond the face of the heads, springs enclosed in the bores of the shafts and acting against the plunger studs to project them into engagement with the bore of the spool or reel held between the heads, means slidable in the bores of the shafts and abutting the opposite ends of the springs, caps on the ends of the shafts, and set-screws threaded through the caps to act against the slidable means to adjust the tension of the springs.

10. In a chuck for spooling and reeling machines, the combination of opposite rotatable heads, means for adjusting the heads in lateral relation with respect to each other, centers projecting from the heads to engage the bore of a spool or reel held therebetween, a series of bores disposed circumferentially around the heads adjacent their peripheries, plungers slidable in the bores, and springs in the bores acting against the plungers to project the latter into clamping engagement with the sides of the spool held between the heads.

11. In a chuck for spooling or reeling machines, the combination of a pair of rotatable heads, means for adjusting the heads in lateral relation with respect to each other, centers arranged axially of the heads and slidably mounted therein, springs acting against said centers to project them beyond the face of the heads into engagement with the bore of a spool or reel held between the heads, a series of plungers arranged about the circumference of the heads and slidably mounted therein, and means for operating the plungers to clamp them against the sides of the spool or reel to steady the latter in the chuck.

12. In a chuck for spooling or reeling machines, the combination of a pair of opposite hollow shafts, plunger studs slidable in the bores of the shafts and provided with tapered portions projecting therefrom, springs housed in the bores of the shafts and acting against the plungers to project them into engagement with the bore of a spool or reel, heads carried on the ends of the shafts and formed with pockets spaced around their circumference, plungers slidable in the pockets, and springs acting on the plungers to project them into binding engagement with the sides of the reel to steady the latter in the chuck.

In testimony whereof I hereunto affix my signature.

HERBERT S. BUSEY.